United States Patent
Yamamoto et al.

(10) Patent No.: US 7,664,577 B2
(45) Date of Patent: Feb. 16, 2010

(54) CONTROL APPARATUS CAPABLE OF ECONOMICALLY AND RELIABLY CONTROLLING ELECTRIC GENERATOR

(75) Inventors: Hiroyoshi Yamamoto, Gifu (JP);
Takeshi Shimoyama, Kariya (JP);
Katsunori Tanaka, Haguri-gun (JP);
Akira Kato, Anjo (JP)

(73) Assignee: Denso Corporation, Kariya (JP)

( * ) Notice: Subject to any disclaimer, the term of this patent is extended or adjusted under 35 U.S.C. 154(b) by 227 days.

(21) Appl. No.: 11/707,987

(22) Filed: Feb. 20, 2007

(65) Prior Publication Data
US 2007/0198132 A1    Aug. 23, 2007

(30) Foreign Application Priority Data
Feb. 21, 2006    (JP)    ............... 2006-044301

(51) Int. Cl.
G05D 3/12    (2006.01)
F02D 25/00    (2006.01)
H02P 15/00    (2006.01)

(52) U.S. Cl. .................... 700/287; 290/40 C; 322/40

(58) Field of Classification Search ................. 700/287; 290/40 C; 322/44
See application file for complete search history.

(56) References Cited

U.S. PATENT DOCUMENTS

| | | | | |
|---|---|---|---|---|
| 4,547,678 A | * | 10/1985 | Metzner et al. | ........... 290/40 C |
| 5,820,172 A | * | 10/1998 | Brigham et al. | ........... 290/40 C |
| 6,335,610 B1 | | 1/2002 | Winstead | |
| 6,362,540 B1 | * | 3/2002 | Hill | .............................. 307/52 |
| 2004/0124703 A1 | | 7/2004 | Tani et al. | |
| 2004/0164616 A1 | | 8/2004 | Obayashi et al. | |
| 2005/0080523 A1 | * | 4/2005 | Bennett et al. | ................. 701/22 |

FOREIGN PATENT DOCUMENTS

| | | |
|---|---|---|
| JP | A 2002-118905 | 4/2002 |
| JP | A 2004-194495 | 7/2004 |
| JP | A 2004-249900 | 9/2004 |
| JP | A 2004-260908 | 9/2004 |
| JP | A 2005-278343 | 10/2005 |

* cited by examiner

*Primary Examiner*—Albert DeCady
*Assistant Examiner*—Thomas H Stevens
(74) *Attorney, Agent, or Firm*—Oliff & Berridge, PLC (57) ABSTRACT

According to the present invention, a control apparatus for an electric generator includes a power generation cost determiner determining a power generation cost of the generator, a threshold determiner determining a threshold of power generation cost as a function of a state of charge of an electric energy storage device, a comparator comparing the power generation cost of the generator with the threshold, and a controller. When the power generation cost of the generator is lower than the threshold, the controller controls the generator to generate an increased amount of electric power, so as to both charge the electric energy storage device and feed an electrical load. Otherwise, when the power generation cost of the generator is higher than the threshold, the controller controls the generator to generate a decreased amount of electric power, so as to allow the electric energy storage device to discharge to feed the electrical load.

27 Claims, 11 Drawing Sheets

CONTROL APPARATUS CAPABLE OF ECONOMICALLY AND RELIABLY CONTROLLING ELECTRIC GENERATOR

CROSS-REFERENCE TO RELATED APPLICATION

This application is based on and claims priority from Japanese Patent Application No. 2006-44301, filed on Feb. 21, 2006, the content of which is hereby incorporated by reference into this application.

BACKGROUND OF THE INVENTION

1. Technical Field of the Invention

The present invention relates generally to power generation controls for electric generators. More particularly, the invention relates to a control apparatus for an electric generator, which can economically and reliably control the power generating operation of the electric generator.

2. Description of the Related Art

In conventional electrical systems for automobiles, a control apparatus (or a voltage regulator) generally controls the power generating operation of an automotive alternator so as to keep the voltage of a power supply bus within a predetermined range.

More specifically, the control apparatus determines a change in the voltage of the power supply bus and controls the power generating operation of the alternator according to the change. The change is caused by a difference between the amount of electric power required by electrical loads connected to the power supply bus and that supplied by electric power sources including the alternator and an automotive battery connected to the power supply bus. The amount of electric power supplied by the electric power sources is equal to the sum of the amount of electric power generated by the alternator and that discharged from (i.e., +) or charged into (i.e., -) the battery. In other words, the control apparatus controls the power generating operation of the alternator to regulate the terminal voltage of the battery to a reference voltage. Accordingly, such a way of power generation control is referred to as constant voltage control.

With the constant voltage control, however, the control apparatus performs a control process on the alternator only after the change in the voltage of the power supply bus has taken place. Consequently, it is difficult to achieve a high control response and to secure high stability of the power supply bus.

To solve the above problem, Japanese Patent First Publications No. 2004-249900 and 2004-194495 disclose another way of power generation control, called power balance control.

According to the power balance control, the control apparatus controls the power generating operation of the alternator to keep balance between the amount of electric power required by the electrical loads and that supplied by the electric power sources, thereby keeping the voltage of the power supply bus within the predetermined range.

With the power balance control, the control apparatus performs a control process on the alternator for keeping balance between the amount of electric power required by the electrical loads and that supplied by the electric power sources when or before an unbalance therebetween occurs. Consequently, a high control response and high stability of the power supply bus can be expected.

Japanese Patent First Publications No. 2002-118905 and 2004-260908 disclose yet another way of power generation control, called power generation cost control.

According to the power generation cost control of Japanese Patent First Publication No. 2004-260908, the control apparatus first determines the power generation cost of each of a plurality of electric power sources in the electrical system. Then, based on the determined power generation costs of the electric power sources, the control apparatus adjusts the power supply percentages of the electric power sources so as to minimize the total power generation cost of the electrical system.

More specifically, the power generation cost of the alternator is determined as an increase in fuel consumption of the engine for driving the alternator to generate unit electric power. The power generation cost of the battery is, on the other hand, determined as the cost for charging unit electric power into the battery. To minimize the total power generation cost of the electrical system, the control apparatus controls the alternator to generate electric power to charge the battery when the power generation cost of the alternator is lower than that of the battery, and controls the battery to discharge when the power generation cost of the battery is lower than that of the alternator. Consequently, a notable improvement in fuel economy of the automobile can be expected.

However, to secure reliability of the power generation cost control, it is required to take measures for keeping the battery from being over-charged or over-discharging. Further, it is also required to take into consideration the fact that the electric energy storage capability and discharge capability of the battery gradually change with repeated charge and discharge operations. Consequently, the control apparatus comes to perform complicated computation so as to meet the above requirements.

SUMMARY OF THE INVENTION

The present invention has been made in view of the above-mentioned problems with the prior art.

It is, therefore, a primary object of the present invention to provide a control apparatus for an electric generator, which can economically, reliably, and easily control the power generating operation of the electric generator.

According to the present invention, there is provided a control apparatus for an electric generator that is driven by an engine and configured to charge an electric energy storage device and feed an electrical load. The control apparatus includes a power generation cost determiner, a threshold determiner, a comparator, and a controller.

The power generation cost determiner works to determine a power generation cost of the electric generator based on parameters representative of operating condition of the engine and an amount of electric power generated by the electric generator.

The threshold determiner works to determine a threshold of power generation cost as a function of a State of Charge (SOC) of the electric energy storage device.

The comparator works to compare the power generation cost of the electric generator with the threshold of power generation cost.

The controller works to control the electric generator to generate:

an increased amount of electric power, if the power generation cost of the electric generator is determined by the comparator as being lower than the threshold, so as to both feed the electrical load and charge the electric energy storage device, and a decreased amount of electric power, if the power generation cost of the electric generator is determined by the comparator as being higher than the threshold, so as to allow the electric energy storage device to discharge to feed the electrical load.

With the above configuration, the control apparatus can economically control the power generating operation of the electric generator based on the comparison between the power generation cost of the electric generator and the threshold of power generation cost.

Further, since the threshold of power generation cost is determined as the function of the SOC of the electric energy storage device, the control apparatus can reliably prevent over-charge and over-discharge of the electric energy storage device and thus can reliably control the power generating operation of the electric generator.

Furthermore, since the SOC of the electric energy storage device has been taken into consideration through the threshold of power generation cost, the control apparatus can easily control the power generating operation of the electric generator without any additional computations for prevention of over-charge and over-discharge of the electric generator.

In a further implementation of the present invention, the power generation cost of the electric generator is represented by an increase in fuel consumption of the engine for driving the electric generator to generate unit electric power.

The control apparatus further includes a SOC determiner working to determine the SOC of the electric energy storage device.

The electric energy storage device is charged with an amount of electric power not greater than a maximum allowable charge power of the electric energy storage device.

The electric energy storage device is allowed to discharge an amount of electric power not greater than a maximum allowable discharge power of the electric energy storage device.

The control apparatus controls the electric generator to stop generating electric power if the power generation cost is determined by the comparator as being higher than the threshold.

The control apparatus further includes a memory storing therein the function which represents a relationship between the SOC of the electric energy storage device and the threshold of power generation cost.

The function is such that the threshold of power generation cost decreases with increase in the SOC of the electric energy storage device in a range from a predetermined lower limit to a predetermined upper limit.

The function is such that the threshold of power generation cost is higher than any possible power generation cost of the electric generator in a range of the SOC lower than the predetermined lower limit, and is lower than any possible power generation cost of the electric generator in a range of the SOC higher than the predetermined upper limit.

The control apparatus further includes a function modifier that works to modify the function based on a change in the SOC of the electric energy storage device for a time period of a given length.

The function modifier modifies the function through shifting a curve representing the function on a two-dimensional map whose horizontal and vertical axes respectively represent the SOC of the electric energy storage device and the threshold of power generation cost.

The function modifier shifts the curve in a direction to decrease an overall average power generation cost of the electric generator such that amount of the shift decreases with increase in the SOC of the electric energy storage device.

The function modifier may determine the amount of the shift as a function of a maximum value of the SOC for the time period.

The function modifier may also determine the amount of the shift as a function of a minimum value of the SOC for the time period.

The function modifier may also determine the amount of the shift as a function of an average variation of the SOC for the time period.

The average variation of the SOC may be determined by integrating a difference between the SOC and a reference value for the time period.

The reference value may be an average of the predetermined lower and upper limits of the SOC.

The function may have a first hysteresis loop in a first range of the SOC including the predetermined lower limit and a second hysteresis loop in a second range of the SOC including the predetermined upper limit.

Otherwise, the function may have a hysteresis loop that occupies a whole of the range from the predetermined lower limit to the predetermined upper limit.

The function may be either of a linear function, a quadratic function, a cubic function, and a sigmoid function.

The function modifier may work to determine a degree of degradation of the electric energy storage device and modify, based on the determined degree of degradation, the function so as to suppress degradation of the electric energy storage device. Moreover, the comparator may further compare the degree of degradation of the electric energy storage device with a predetermined threshold; when the degree of degradation exceeds the predetermined threshold, the controller may control the electric generator to regulate a terminal voltage of the electric energy storage device to a reference voltage.

The electric generator may be an automotive alternator and the electric energy storage device may be an automotive battery.

The parameters representative of operating condition of the engine may include a rotational speed of the engine and an output torque of the engine.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

The preferred embodiments of the present invention will be described hereinafter with reference to FIGS. 1-19.

First Embodiment

Figure 1:
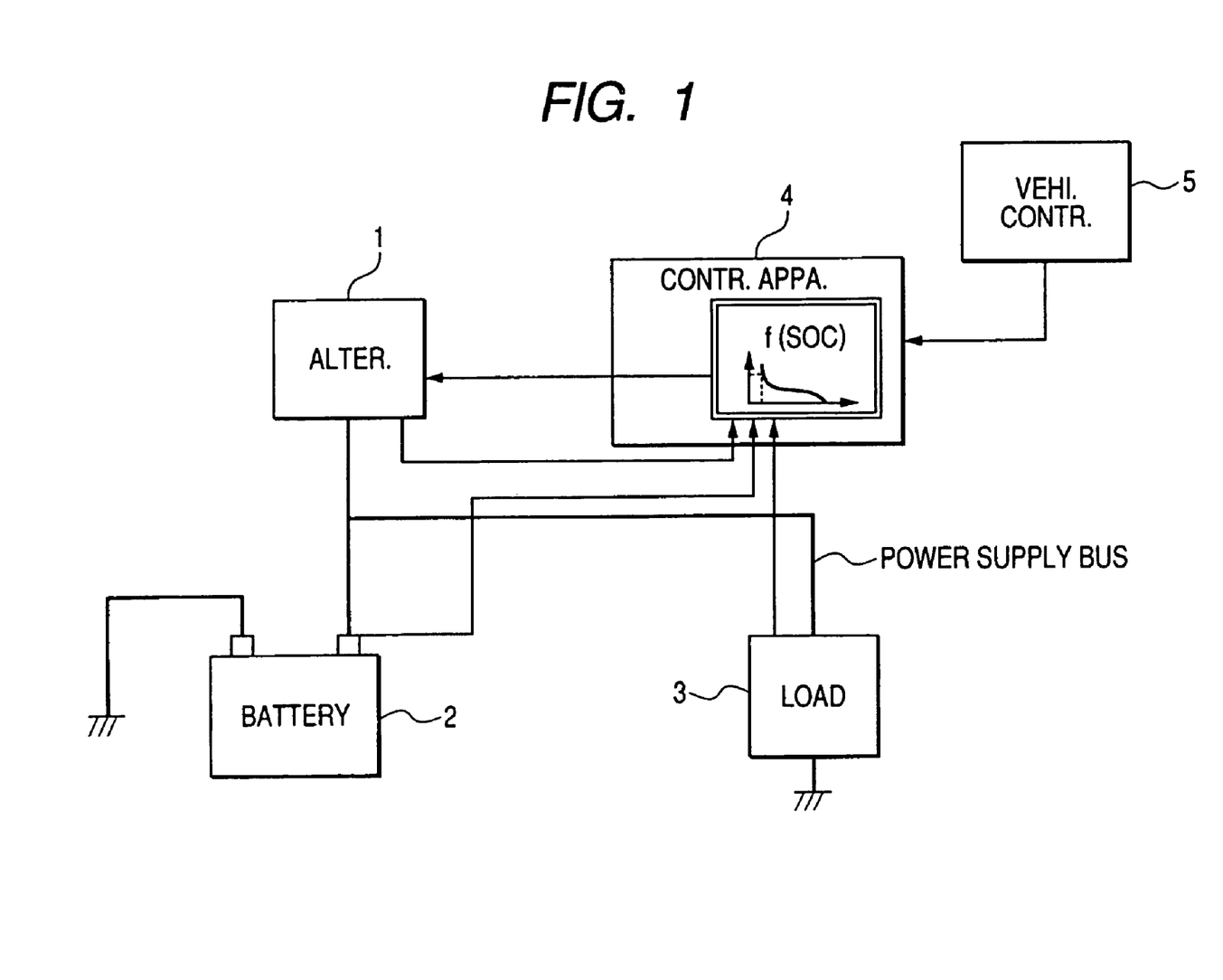
FIG. 1 is a schematic diagram showing the overall configuration of an automotive electrical system according to the first embodiment of the invention.

FIG. 1 shows the overall configuration of an electrical system according to the first embodiment of the invention. The electrical system is designed for use in an automobile.

As shown in FIG. 1, the electrical system includes an automotive alternator 1, an automotive battery 2, an electrical load 3, and a control apparatus 4.

The alternator 1 is configured to be driven by an internal combustion engine (not shown) of the automobile to generate electric power. The alternator 1 is electrically connected, via a power supply bus, to both the battery 2 and the electrical load 3, so that it can charge the battery 2 and can feed the electrical load 3. The battery 2 can also feed the electrical load 3 by discharging. The control apparatus 4 works to control the power generating operation of the alternator 1 based on information from the battery 2, the electrical load 3, and a vehicle controller 5.

The information from the battery 2 includes, for example, the State of Charge (SOC) of the battery 2. The information from the electrical load 3 includes, for example, the electric current supplied to the electrical load 3. The information from the vehicle controller 5 includes, for example, the running condition of the automobile. In addition, an engine controller (not shown) controls the operation of the engine and provides necessary information on the operating condition of the engine to the control apparatus 4 via the vehicle controller 5. It should be appreciated that the control apparatus 4, the vehicle controller 5, and the engine controller can be integrated into a single control device.

Figure 2:
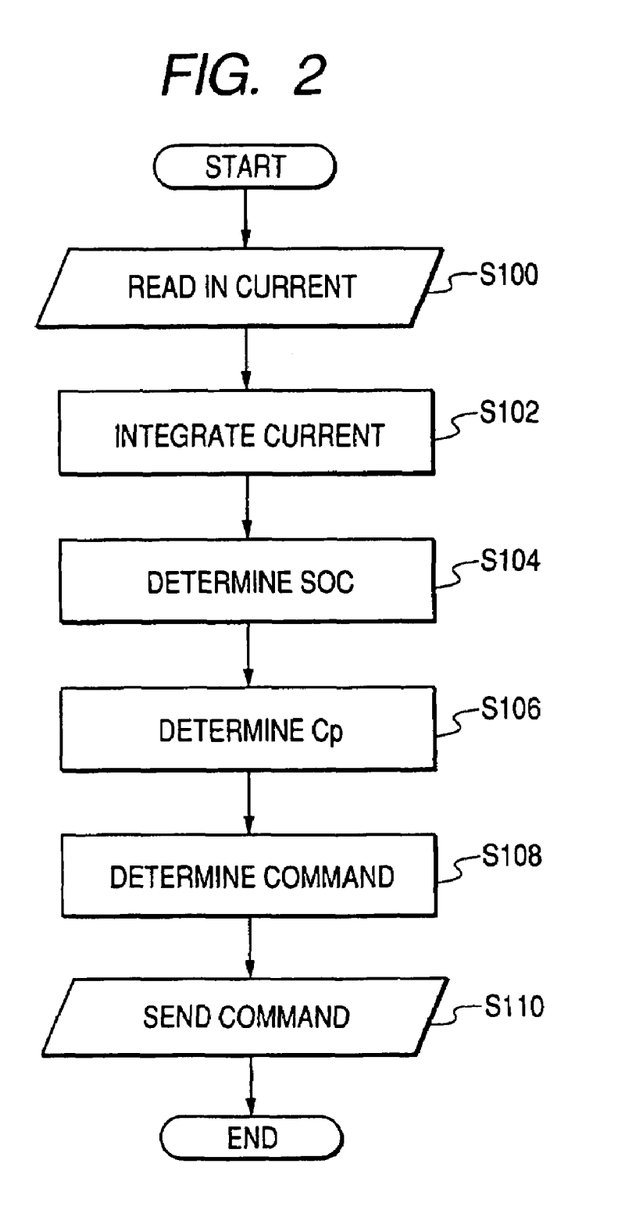
FIG. 2 is a flow chart showing a main process of a control apparatus for controlling the power generating operation of an automotive alternator in the electrical system.

FIG. 2 shows a main process of the control apparatus 4 for controlling the power generating operation of the alternator 1. The process is based on a power generation cost control according to the present embodiment.

First, at the step S100, the control apparatus 4 reads in a charge/discharge current of the battery 2 sensed by a current sensor (not shown). Then, at the step S102, the control apparatus 4 integrates the charge/discharge current.

At the step S104, the control apparatus 4 determines a present value of the SOC of the battery 4 by dividing the difference between a maximum charge capacity of the battery 2 and the current-integration value obtained at the step S102 by the maximum charge capacity.

In addition, any other method known in the art may be used to determine the SOC of the battery 2 instead of the above current-integration method. Moreover, the maximum charge capacity of the battery 2 may be predetermined as the difference between the current-integration values obtained when the battery 2 has been fully charged (i.e., the SOC is 100%) and when the battery 2 has fully discharged (i.e., the SOC is 0%). Furthermore, any method known in the art may be used to determine whether the battery 2 is in the fully-charged or fully-discharged condition.

At the step S106, the control apparatus 4 determines a threshold Cp of power generation cost by substituting the present value of the SOC into a threshold function f (SOC) that is pre-stored in a memory of the control apparatus 4.

In the present embodiment, the threshold Cp of power generation cost is used to determine whether or not to allow the alternator 1 to charge the battery 2. More specifically, when a power generation cost Cg of the alternator 1 is lower than the threshold Cp, the alternator 1 is allowed to generate electric power to charge the battery 2 as well as feed the electrical load 3. The threshold function f (SOC) represents a relationship between the SOC of the battery 2 and the threshold Cp of power generation cost. The threshold function f (SOC) used in the present embodiment is to be described in detail latter. In addition, the threshold function f (SOC) may be stored in the memory in the form of a function expression, a table, or a map.

At the step S108, the control apparatus 4 determines a command for the power generating operation of the alternator 1. Then, at the step S110, the control apparatus 4 sends the determined command to the alternator 1, so that the alternator 1 can operate in accordance with the command.

Figure 3:
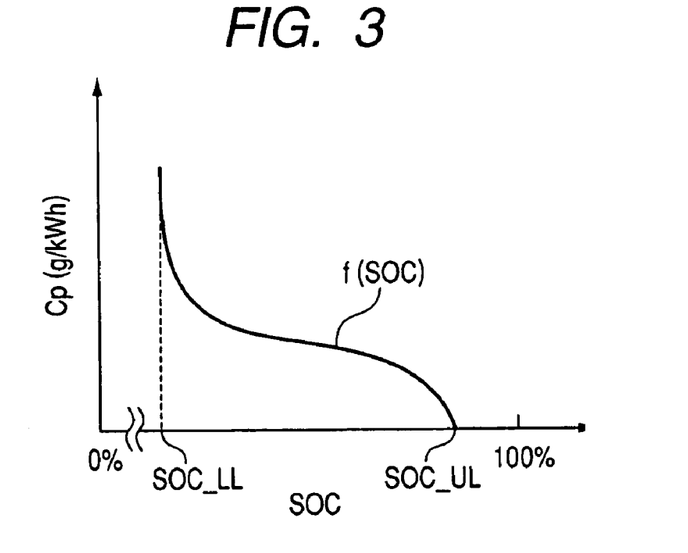
FIG. 3 is a graphical representation showing a threshold function f (SOC) used in the process of FIG. 2.

Referring now to FIG. 3, in the present embodiment, the threshold function f (SOC) is a cubic function in a range of the SOC from a predetermined lower limit SOC_LL to a predetermined upper limit SOC_UL, so that the threshold Cp decreases with increase in the SOC in that range. Further, the threshold CP is set to be higher than any practically possible power generation cost Cg of the alternator 1 in a range of the SOC lower than the SOC_LL and to be lower than any practically possible power generation cost Cg of the alternator 1 (e.g., lower than zero) in a range of the SOC higher than the SOC_UL. In addition, the lower limit SOC_LL is set to, for example, 20%, while the upper limit SOC_UL is set to, for example, 80%.

Using the above threshold function f (SOC), when the SOC of the battery 2 is high, the alternator 1 generates electric power to charge the battery 2 only if the power generation cost Cg thereof is sufficiently low. Moreover, since the battery 2 is in a adequately-charged condition, it can discharge to feed the electrical load 3 in response to a slight increase in the power generation cost Cg of the alternator 1. On the contrary, when the SOC of the battery 2 is low, the alternator 1 generates electric power to charge the battery 2 unless the power generation cost Cg thereof is very high. Moreover, since the battery 2 is in a inadequately-charged condition, it can discharge to feed the electrical load 3 only in response to a great increase in the power generation cost Cg of the alternator 1.

Figure 4:
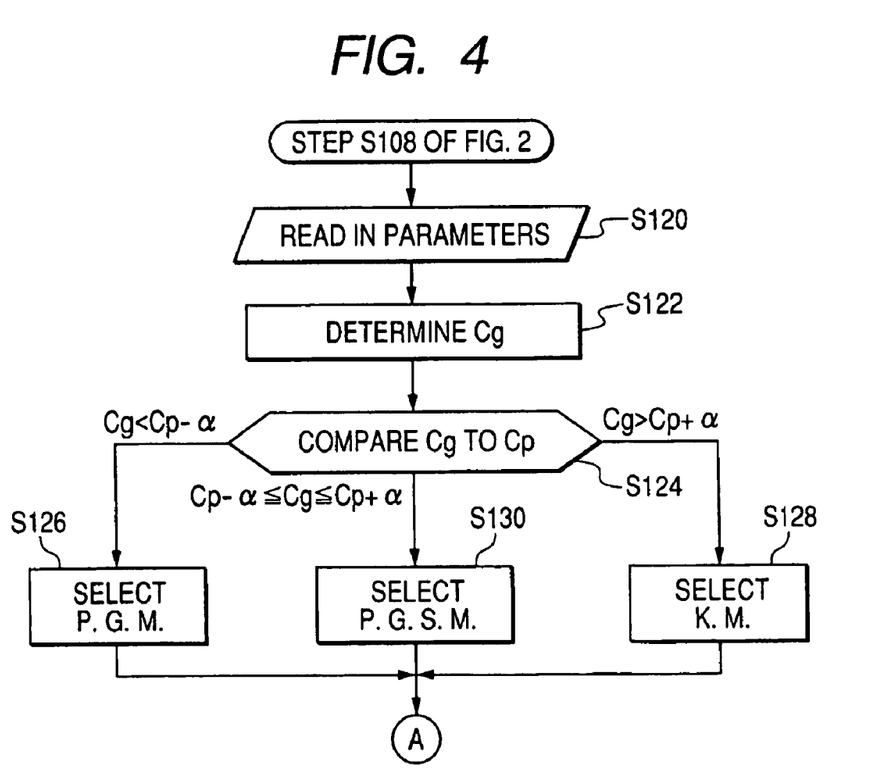
FIG. 4 is a flow chart showing a sub process of the control apparatus for determining a command for the power generating operation of the alternator.

FIG. 4 shows a sub process of the control apparatus 4 for determining the command for the power generating operation of the alternator 1. This sub process corresponds to the step S108 of the main process shown in FIG. 2.

First, at the step S120, the control apparatus 4 reads in parameters representative of the operating condition of the engine. In the present embodiment, the parameters include the rotational speed, the output torque, and the fuel consumption per unit time of the engine. The detection of those parameters is well-known in the art; thus the description thereof is omitted here.

Then, at the step S122, the control apparatus 4 determines the power generation cost Cg of the alternator 1 by the following equation:

$$Cg=(mp-m0)/P \quad \text{(Equation 1)},$$

where P is the amount of electric power generated by the alternator 1, mp is the fuel consumption of the engine when driving the alternator 1 to generate the amount P of electric power, and m0 is the fuel consumption of the engine when running without driving the alternator 1 to generate electric power.

Figure 5:
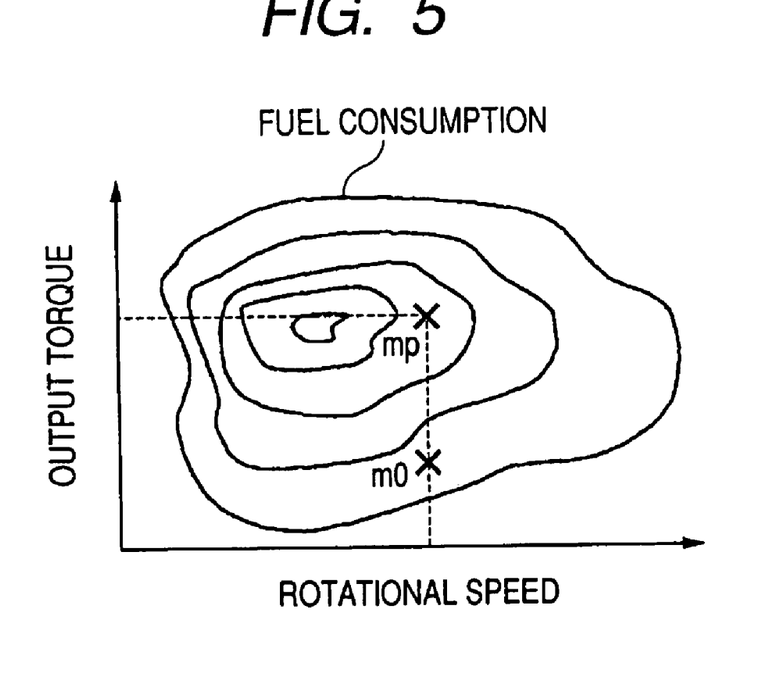
FIG. 5 is a graphical representation showing a map that represents a relationship among the fuel consumption, the rotational speed, and the output torque of an engine driving the alternator.

In the present embodiment, mp and m0 are determined by using a three-dimensional map as shown in FIG. 5. The map is stored in the memory of the control apparatus 4 and represents the relationship among the fuel consumption, the rotational speed, and the output torque of the engine.

At the step S124, the control apparatus 4 compares the power generation cost Cg of the alternator 1 to the threshold Cp determined at the step S106 of FIG. 2.

If Cg is lower than (Cp−α), then the process proceeds to the step S126, at which a power generation mode (abbreviated as P. G. M. in FIG. 4) of the alternator 1 is selected. Here, α is a predetermined constant used for stabilization of the control.

Else if Cg is higher than (Cp+α), then the process goes on to the step S128, at which a Power Generation Stop Mode (abbreviated as P. G. S. M. in FIG. 4) of the alternator 1 is selected.

Otherwise, if Cg is not lower than (Cp−α) and not higher than (Cp+α), then the process proceeds to the step S130, at which a Keeping Mode (abbreviated as K. M. in FIG. 4) of the alternator 1 is selected.

Thus, either of the power generation mode, the power generation stop mode, and the keeping mode is selected as the command for the power generating operation of the alternator 1.

As to the operation of the alternator 1 in each selected mode, three different examples are given below.

EXAMPLE 1

In this example, a power transistor (not shown), which is used to control the field current supply to a field winding of the alternator 1, is turned on when the power generation mode of the alternator 1 is selected, is turned off when the power generation stop mode is selected, and kept in the previous state of on/off operation thereof when the keeping mode is selected.

Figure 6:
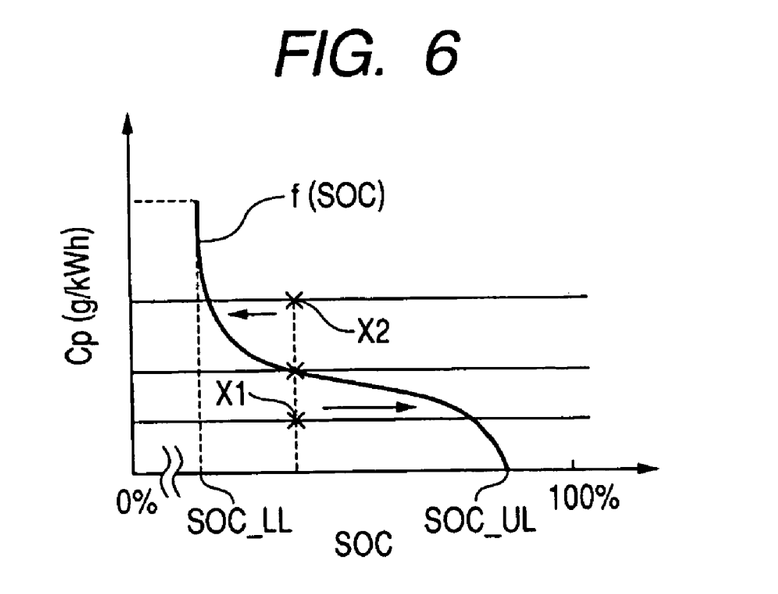
FIG. 6 is a graphical representation illustrating a relationship between the threshold function f (SOC) and the command for the power generating operation of the alternator.

More specifically, referring to FIG. 6, when the power generation cost Cg of the alternator 1 is lower than the threshold Cp, as indicted at the point X1 in the figure, the power generation mode is selected. Thus, the alternator 1 enters the power generation mode to generate electric power, thereby both feeding the electrical load 3 and charging the battery 2. As a result, the SOC of the battery 2 is increased. On the contrary, when the power generation cost Cg of the alternator 1 is higher than the threshold Cp, as indicated at the point X2 in FIG. 6, the power generation stop mode is selected. Thus, the alternator 1 enters the power generation stop mode to stop generating electric power, thereby allowing the battery 2 to discharge to feed the electrical load 3. As a result, the SOC of the battery 2 is decreased.

In the above way, the control apparatus 4 can control the power generating operation of the alternator 1 in a very simple manner.

EXAMPLE 2

In this example, the control apparatus 4 controls the power generating operation of the alternator 1 using a hybrid of the power generation cost control and the power balance control.

More specifically, the control apparatus 4 first determines the amount of electric power to be discharged from (i.e., +) or charged into (i.e., −) the battery 2 (to be simply referred to as charge/discharge power of the battery 2 hereinafter).

It should be noted that the power generation cost Cg of the alternator 1 is taken into consideration in the determination of the charge/discharge power of the battery 2.

Then, the control apparatus 4 determines the amount of electric power required to be generated by the alternator 1 by subtracting the charge/discharge power of the battery 2 from the amount of electric power required by the electrical load 3.

After that, the control apparatus 4 controls the alternator 1 to generate the determined amount of electric power.

Consequently, with the hybrid control, the SOC of the battery 2 increases when the power generation cost Cg of the alternator 1 is low, and decreases when the power generation cost Cg is high.

Figure 7:
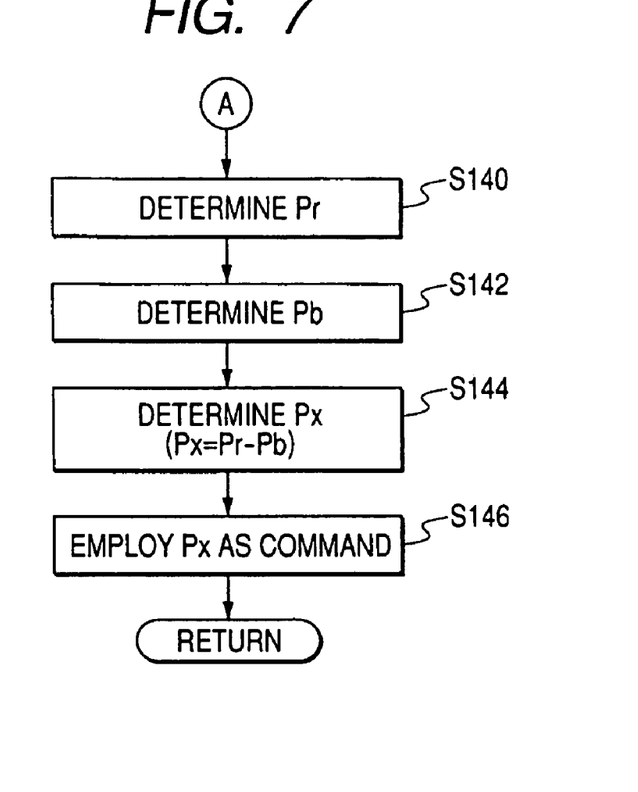
FIG. 7 is a flow chart showing a sub process of the control apparatus for performing a hybrid control on the alternator.

FIG. 7 shows a sub process of the control apparatus 4 for performing the above-described hybrid control. This sub process can be considered as a continuation of the sub process shown in FIG. 4.

First, at the step S140, the control apparatus 4 determines the amount Pr of electric power required by the electrical load 3 based on the current supplied to the electric load 3 and the terminal voltage of the battery 2.

It should be noted that any other method known in the art may also be used to determine the amount Pr of electric power. For the sake of simplicity, the amount Pr of electric power required by the electrical load 3 is to be referred to as load power Pr hereinafter.

Then, at the step S142, the control apparatus 4 determines the charge/discharge power Pb of the battery 2 according to the operation mode of the alternator 1 selected in the sub process shown in FIG. 4.

More specifically, when the power generation mode is selected, the power generation cost Cg of the alternator 1 is lower than the threshold Cp. Therefore, to promote power generation of the alternator 1, in other words, to allow the alternator 1 to generate an increased amount of electric power, the charge/discharge power Pb of the battery 2 is set to a negative value. That is, the battery 2 is to be charged by the alternator 1. In this example, the Pb is set to a predetermined maximum allowable charge power.

On the contrary, when the power generation stop mode is selected, the power generation cost Cg of the battery 2 is higher than the threshold Cp. Therefore, to suppress power generation of the alternator 1, in other words, to allow the alternator 1 to generate a decreased amount of electric power, the charge/discharge power Pb of the battery 2 is set to a positive value. That is, the battery 2 is to discharge to feed the electrical load 3. In this example, the Pb is set to a predetermined maximum allowable discharge power.

Otherwise, when the keeping mode is selected, the power generation cost Cg of the alternator 1 is almost equal to the threshold Cp. Therefore, to keep the present level of power generation of the alternator 1, the charge/discharge power Pb of the battery 2 is kept at the present value.

In addition, the maximum allowable charge power is predetermined such that when the battery 2 is charged with it, the terminal voltage of the battery 2 will not exceed a predetermined maximum allowable voltage. Similarly, the maximum allowable discharge power is predetermined such that when the battery 2 discharges it, the terminal voltage of the battery 2 will not drop below a predetermined minimum allowable voltage.

At the succeeding step S144, the control apparatus 4 determines the amount Px of electric power required to be generated by the alternator 1 by subtracting the charge/discharge power Pb of the battery 2 from the load power Pr.

At the step S146, the determined Px is employed, instead of the selected operation mode, as the command for the power generating operation of the alternators 1.

In accordance with the command, the alternator 1 generates the amount Px of electric power. More specifically, based on the amount Px of electric power and the rotational speed of the alternator 1, the amount of field current to be supplied to the field winding of the alternator 1 is first determined. Then, the determined amount of field current is supplied to the field winding, thus producing the amount Px of electric power.

In addition, in this example, the power generation stop mode of the alternator 1 does not equal a mode in which the alternator 1 completely stops generating electric power. In other words, in the power generation stop mode of this example, the alternator 1 may generate electric power to feed the electrical load 3 without charging the battery 2.

EXAMPLE 3

This example is a variation of the example 2. Therefore, only the differences therebetween will be described.

In the previous example 2, the charge/discharge power Pb of the battery 2 is set to the predetermined (i.e., fixed) maximum allowable charge or discharge power of the battery 2.

In comparison, in this example, the charge/discharge power Pb of the battery 2 is determined by using maps stored in the memory of the control apparatus 4.

More specifically, the terminal voltage of the battery 2 (i.e., the voltage of the power supply bus of the electrical system) is allowed to change only within a limited range around a reference voltage. Moreover, the terminal voltage of the battery 2 is a function of the charge/discharge current of the battery 2, and the charge/discharge power Pb of the battery 2 is equal to the product of the charge/discharge current and the terminal voltage of the battery 2. Accordingly, the charge/discharge power Pb of the battery 2 is required to be so set as to keep the terminal voltage of the battery 2 within the limited range.

In view of the above, in this example, when the power generation mode is selected, the maximum allowable charge power is first determined, by using a charge map stored in the memory, as the charge power with which the battery 2 can be charged to bring the terminal voltage thereof to the maximum allowable voltage. The charge/discharge power Pb of the battery 2 is then set to the determined maximum allowable charge power. On the contrary, when the power generation stop mode is selected, the maximum allowable discharge power is first determined, by using a discharge map stored in the memory, as the discharge power which the battery 2 can discharge to brining the terminal voltage thereof to the minimum allowable voltage. The charge/discharge power Pb of the battery 2 is then set to the determined maximum allowable discharge power.

The charge and discharge maps may be predetermined to respectively represent the relationships between the load power Pr and the maximum allowable charge power and between the load power Pr and the maximum allowable discharge power. This is because the terminal voltage of the battery 2 is a function of the load power Pr.

Otherwise, the charge and discharge maps may be predetermined to respectively represent the relationships between the SOC of the battery 2 and the maximum allowable charge power and between the SOC and the maximum allowable discharge power. This is because the terminal voltage of the battery 2 is a function of the SOC of the battery 2.

Variation 1

In the hybrid control shown in FIG. 7, it is also possible to use current instead of electric power.

More specifically, the load power Pr, the charge/discharge power Pb of the battery 2, and the required output power Px of the alternator 1 are based on almost the same voltage of the power supply bus. Thus, it is possible to obtain the load current Ir, the charge/discharge current Ib, and the required output current Ix by dividing the Pr, Pb, and Px by the voltage of the power supply bus, respectively. Then, the field current supplied to the field winding of the alternator 1 can be controlled, by using a map, to allow the alternator 1 to output the current IX. The map is a three-dimensional map which represents the relationship among the output current IX of the alternator 1, the field current, and the rotational speed of the alternator 1.

Variation 2

In this variation, the threshold function f (SOC) shown in FIG. 3 is modified based on a change in the SOC of the battery 2.

Figure 8:
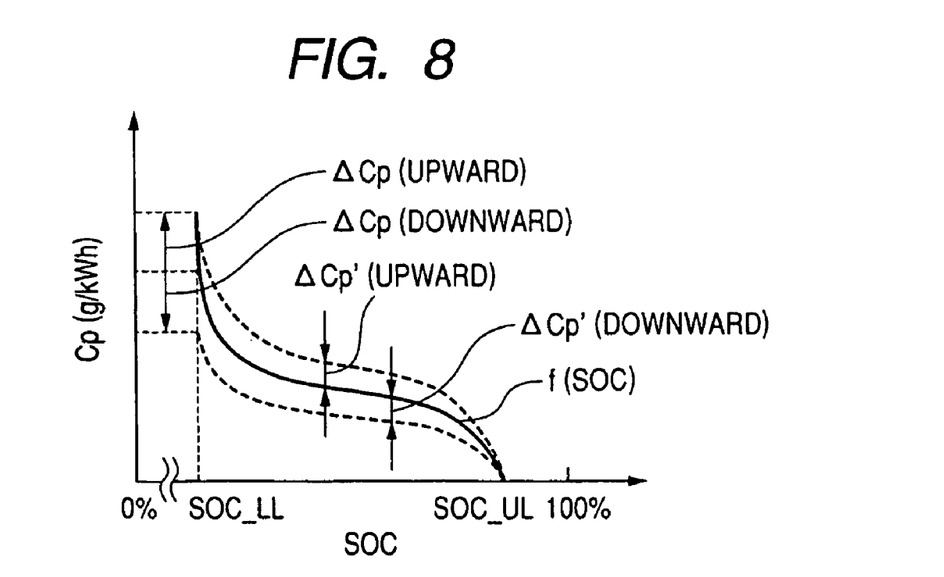
FIG. 8 is a graphical representation illustrating a modification of the threshold function f (SOC) by shitting a curve representing the threshold function f (SOC)

More specifically, based on the change in the SOC of the battery 2 for a most recent time period of a given length, the control apparatus 4 shifts the threshold function f (SOC) in a direction to decrease the overall average power generation cost of the alternator 1 such that amount of the shift decreases with increase in the SOC. In other words, as shown in FIG. 8, the amount ΔCP of the shift at the lower limit SOC_LL of the SOC is greater than the amount ΔCP' of the shift at any other value of the SOC.

Figure 9:
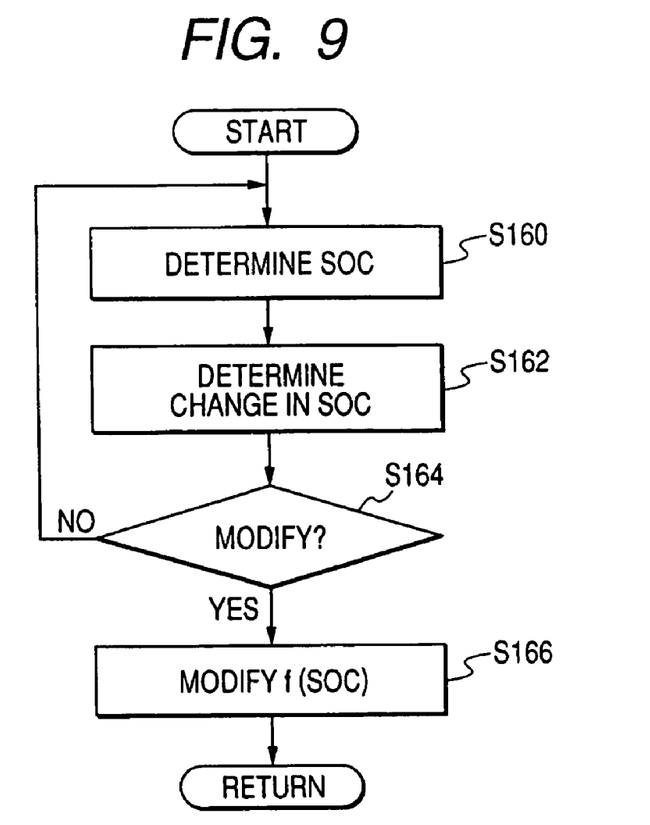
FIG. 9 is a flow chart showing a process of the control apparatus for modifying the threshold function f (SOC)

FIG. 9 shows a process of the control apparatus 4 for modifying the threshold function f (SOC).

First, at the step S160, the control apparatus 4 determines and stores in the memory thereof the SOC of the battery 2 at regular intervals.

Then, at the step S162, the control apparatus 4 determines the change in the SOC of the battery 2 for the most recent time period of the given length.

At the succeeding step S164, the control apparatus 4 determines, based on the change in the SOC of the battery 2, whether it is necessary to modify the threshold function f (SOC).

If the determination at the step S164 produces a "NO" answer, then the process returns to the step S160.

Otherwise, if the determination at the step S164 produces a "YES" answer, then the process proceeds to the step S166.

At the step S166, the control apparatus 4 modifies the threshold function f (SOC).

In this particular embodiment, the change in the SOC of the battery 2 for the most recent time period is represented by the maximum value of the SOC, the minimum value of the SOC, and the average variation SOC_AV in the SOC for that time period.

Figure 10:
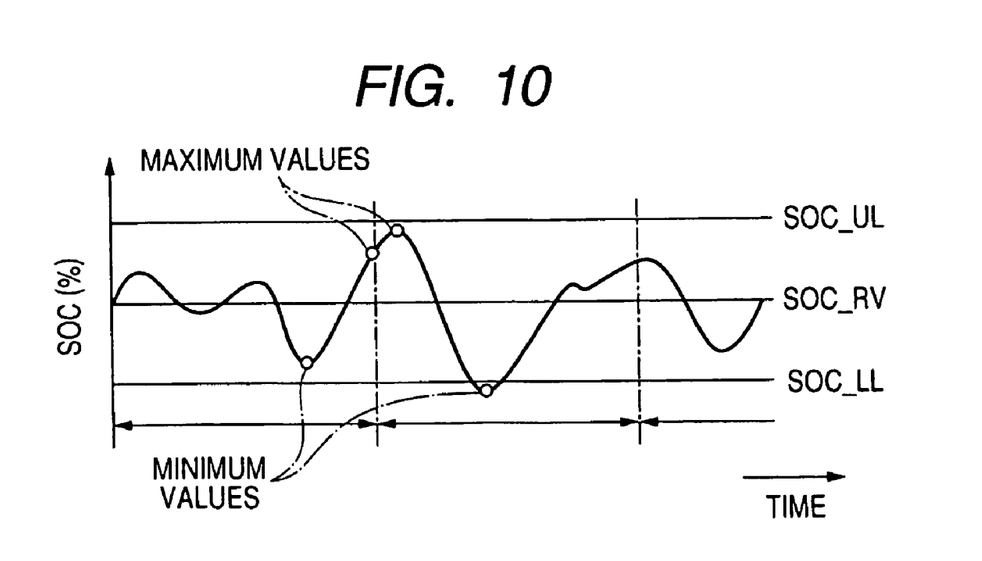
FIG. 10 is a graphical representation illustrating a change in the SOC of an automotive battery that is configured to be charged by the alternator.

FIG. 10 shows an example of change in the SOC of the battery 2 when the automobile is running. A reference value SOC_RV of the SOC is also shown in the figure, which may be the average of the upper limit SOC_UL and the lower limit SOC_LL. The average variation SOC_AV can be determined by the following equation:

$$SOC\_AV = \int |SOC - SOC\_RV| dt \quad \text{(Equation 2)},$$

where the integration is made for the most recent time period of the given length.

Based on the above-determined change in the SOC of the battery 2, the amount $\Delta CP$ of the shift at the lower limit SOC_LL is then determined by using a predetermined four-dimensional map which represents the relationship among the amount $\Delta CP$ of the shift, the maximum value of the SOC, the minimum value of the SOC, and the average variation in the SOC.

Then, based on the determined $\Delta CP$, the amount $\Delta CP'$ at other value of the SOC can be determined by the following equation:

$$\Delta CP' = f1(\Delta CP, SOC) \quad \text{(Equation 3)},$$

where f1 is a predetermined function.

Thus, the threshold function f (SOC) is modified. It should be noted that the function f1 is predetermined so that $\Delta CP'$ decreases with increase in the SOC of the battery 2. It also should be noted that the four-dimensional map is predetermined so as to shift the threshold function f (SOC) in the direction to decrease the overall average power generation cost of the alternator 1.

More specifically, when the maximum value of the SOC for the most recent time period is large, the SOC of the battery 2 is likely to reach the upper limit SOC_UL in a near future. Further, when the SOC of the battery 2 is at the upper limit SOC_UL, the alternator 1 cannot charge the battery 2 even if the then power generation cost Cg thereof is very low, thus increasing the overall average power generation cost thereof.

Therefore, using the map, when the maximum value of the SOC is close to the upper limit SOC_UL, the threshold function f (SOC) is shifted downward, i.e., is modified to decrease the threshold Cp. Consequently, power generation of the alternator 1 is suppressed, thus decreasing the SOC of the battery 2. As a result, the overall average power generation cost of the alternator 1 is decreased.

Moreover, when the minimum value of the SOC for the most recent time period is small, the SOC of the battery 2 is likely to reach the lower limit SOC_LL in a near future. Further, when the SOC of the battery 2 is at the lower limit SOC_LL, the alternator 1 may charge the battery 2 even if the then power generation cost thereof is very high, thus decreasing the overall power generation cost thereof.

Therefore, using the map, when the minimum value of the SOC is close to the lower limit SOC_LL, the threshold function f (SOC) is shifted upward, i.e., is modified to increase the threshold Cp. Consequently, power generation of the alternator 1 is promoted to charge the battery 2, thus increasing the SOC of the battery 2. As a result, the overall average power generation cost of the alternator 1 is increased.

Furthermore, when the average variation in the SOC is greater than a predetermined positive threshold, the SOC of the battery 2 is likely to reach the upper limit SOC_UL in a near future.

Therefore, using the map, when the average variation in the SOC is greater than the predetermined positive threshold, the threshold function f (SOC) is shifted downward, i.e., is modified to decrease the threshold Cp. Consequently, power generation of the alternator 1 is suppressed, thus decreasing the SOC of the battery 2. As a result, the overall average power generation cost of the alternator 1 is decreased.

On the contrary, when the average variation in the SOC is less than a predetermined negative threshold, the SOC of the battery 2 is likely to reach the lower limit SOC_LL in a near future.

Therefore, using the map, when the average variation in the SOC is less than the predetermined negative threshold, the threshold function f (SOC) is shifted upward, i.e., is modified to increase the threshold Cp. Consequently, power generation of the alternator 1 is promoted to charge the battery 2, thus increasing the SOC of the battery 2. As a result, the overall average power generation cost of the alternator 1 is increased.

In addition, it is also possible to modify the four-dimensional map itself according to the running condition of the automobile. The running condition may include, for example, acceleration, deceleration, regenerative braking, and idle stop of the automobile. In this case, the modification to the map is also made in a direction to decrease the overall average power generation cost of the alternator 1.

Other Variations

Figure 11:
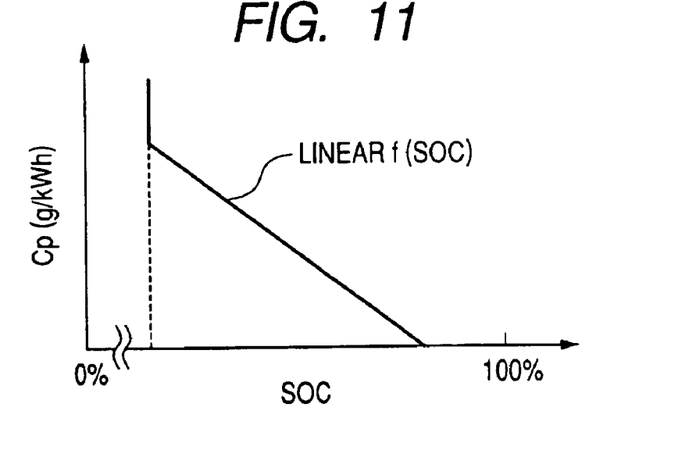
FIG. 11 is a graphical representation showing a variation of the threshold function f (SOC)

FIG. 11 shows a variation of the threshold function f (SOC), which is a linear function.

Figure 12:
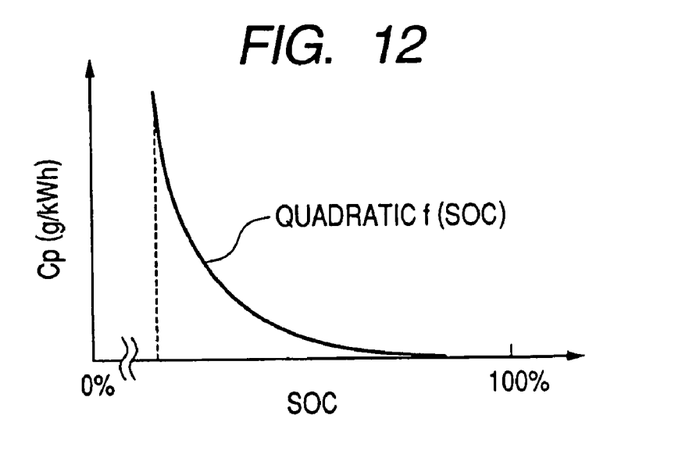
FIG. 12 is a graphical representation showing another variation of the threshold function f (SOC)

FIG. 12 shows another variation of the threshold function f (SOC), which is a quadratic function.

Figure 13:
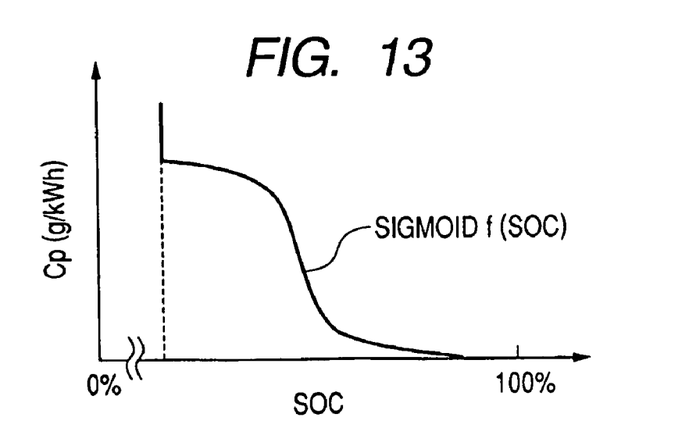
FIG. 13 is a graphical representation showing yet another variation of the threshold function f (SOC)

FIG. 13 shows yet another variation of the threshold function f (SOC), which is a sigmoid function.

Figure 14:
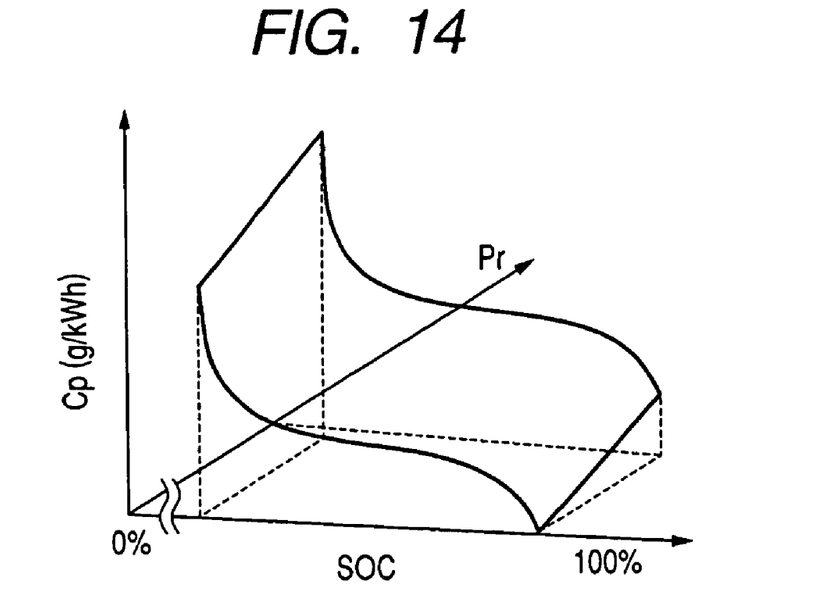
FIG. 14 is a graphical representation showing still another variation of the threshold function f (SOC)

FIG. 14 shows still another variation of the threshold function f (SOC), which is in the form of a three-dimensional map representing a relationship among the SOC of the battery 2, the load power Pr, and the threshold Cp.

Figure 15:
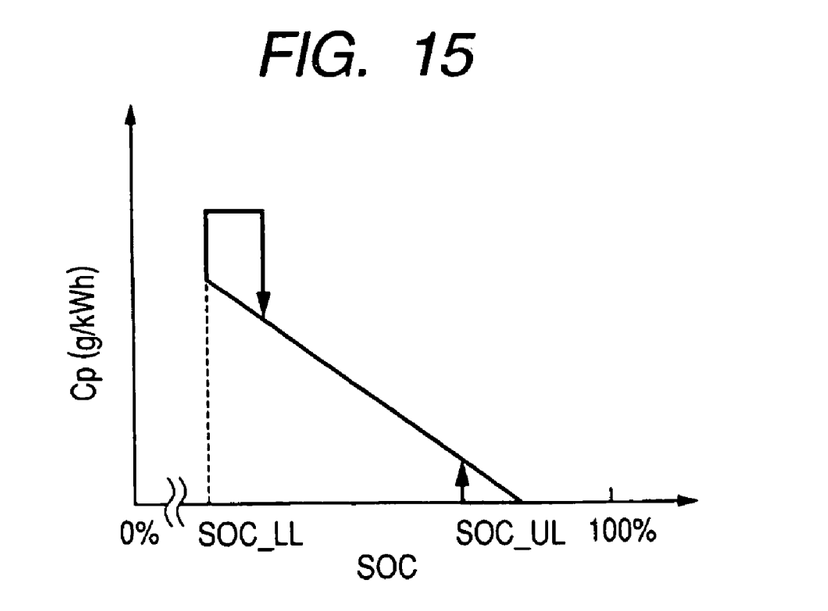
FIG. 15 is a graphical representation showing still yet another variation of the threshold function f (SOC)

FIG. 15 shows still yet another variation of the threshold function f (SOC), which has hysteresis loops in the vicinities of the lower and upper limits SOC_LL and SOC_UL of the SOC of the battery 2, so as to prevent frequent changes in operation mode of the alternator 1.

More specifically, with the threshold function shown in FIG. 15, when the SOC of the battery 2 has dropped to the lower limit SOC_LL, the threshold CP is given an extremely large value and keeps that value until the SOC recovers to an acceptably low level. On the contrary, when the SOC of the battery 2 has risen to the upper limit SOC_UL, the threshold CP is given zero and keeps zero until the SOC recovers to an acceptably high level.

Consequently, frequent changes in operation mode of the alternator can be prevented, and the service life of the battery 2 can be extended.

Second Embodiment

In this embodiment, the control apparatus 4 controls the power generating operation of the alternator 1 by using a pair of threshold functions fL (SOC) and fH (SOC).

Figure 16:
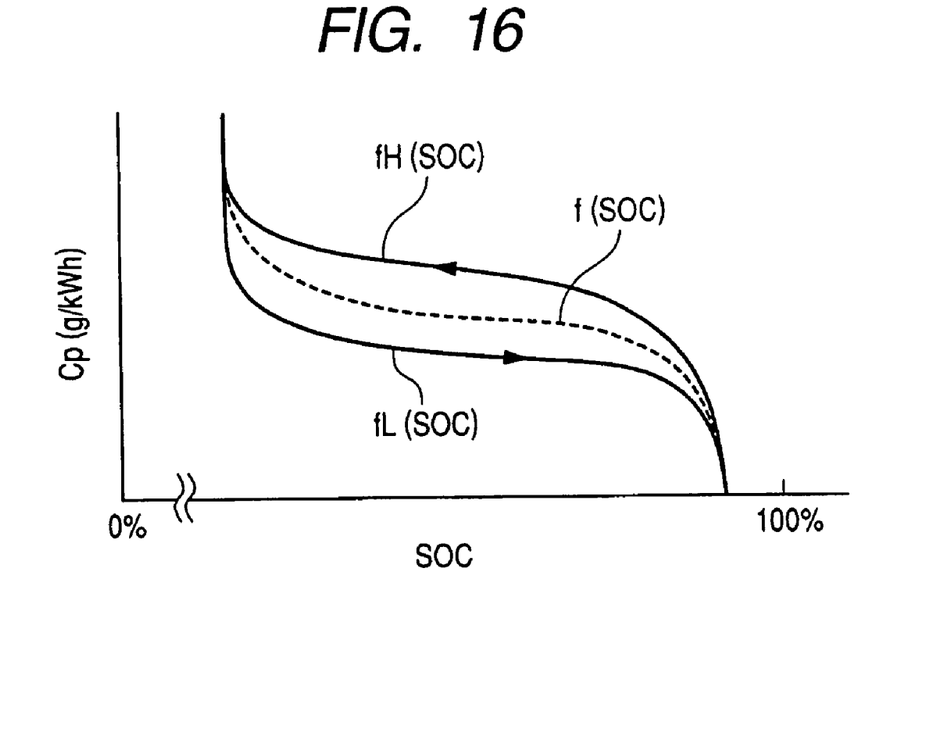
FIG. 16 is a graphical representation showing a pair of threshold functions fL (SOC) and fH (SOC) according to the second embodiment of the invention.

Referring to FIG. 16, the two functions fL (SOC) and fH (SOC) together form a hysteresis loop around the threshold function f (SOC) of the previous embodiment shown in FIG. 3.

The threshold function fL (SOC) is used to determine the threshold Cp of power generation cost when the SOC of the battery 2 is on the rise on a long-term basis. On the other hand, the threshold function fH (SOC) is used to determine the threshold Cp of power generation cost when the SOC of the battery 2 is on the decline on a long-term basis.

In other words, the threshold function fL (SOC) is obtained by shifting the f (SOC) of the previous embodiment downward when there is a continued tendency for the battery 2 to be charged. Similarly, the threshold function fH (SOC) is obtained by shifting the threshold function f (SOC) upward when there is a continued tendency for the battery 2 to discharge.

Thus, when the battery 2 has a continued tendency to be charged, the threshold CP is determined by using the threshold function fL (SOC), so that the battery 2 can discharge unless the then power generation cost cg of the alternator 1 is very low. On the contrary, when the battery 2 has a continued tendency to discharge, the threshold CP is determined by using the threshold function fH (SOC), so that the battery 2 can be charged unless the then power generation cost Cg of the alternator 1 is very high.

Consequently, by using the pair of threshold functions fL (SOC) and fH (SOC), it is possible to more suitably control the power generating operation of the alternator 1 according to the SOC of the battery 2.

Especially, when there is detected a degradation of the battery 2, it is possible to suitably control the power generating operation of the alternator 1 to suppress further degradation of the battery 2.

Third Embodiment

In this embodiment, degradation of the battery 2 is taken into consideration in the control of the control apparatus 4 on the power generating operation of the alternator.

Figure 17:
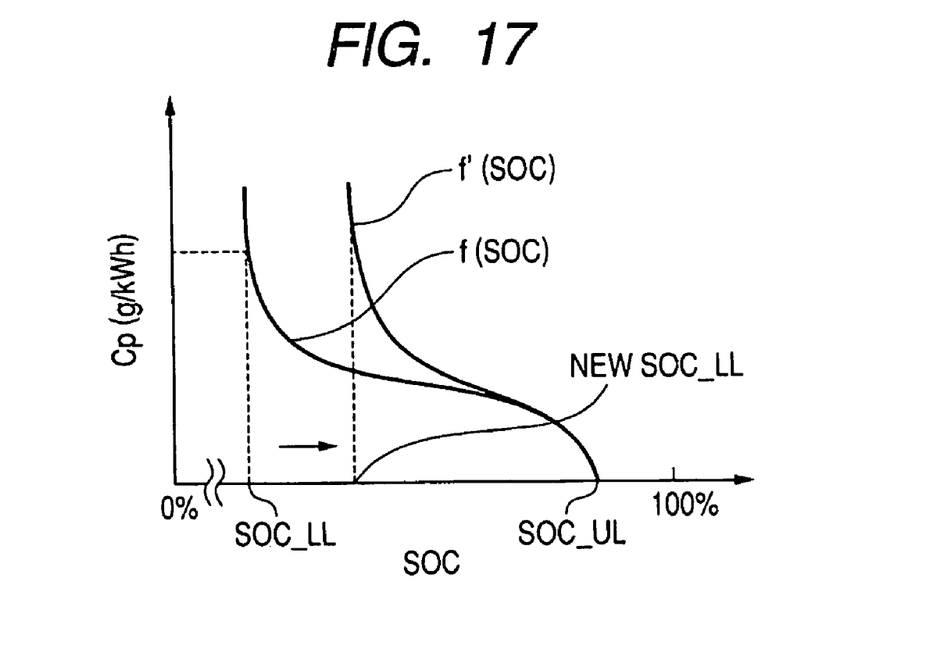
FIG. 17 is a graphical representation showing a threshold function f' (SOC) according to the third embodiment of the invention.

Referring to FIG. 17, when a considerable degradation of the battery 2 is detected, the control apparatus 4 shifts the threshold function f (SOC) of the first embodiment shown in FIG. 3 to increase the lower limit SOC_LL of the SOC of the battery 2. The difference between the SOC_LL in the original threshold function f (SOC) and the new SOC_LL in the resultant function f' (SOC) is determined based on the degree of degradation of the battery 2. For example, the new SOC_LL can be set in proportion to the degree of degradation of the battery 2.

Figure 18:
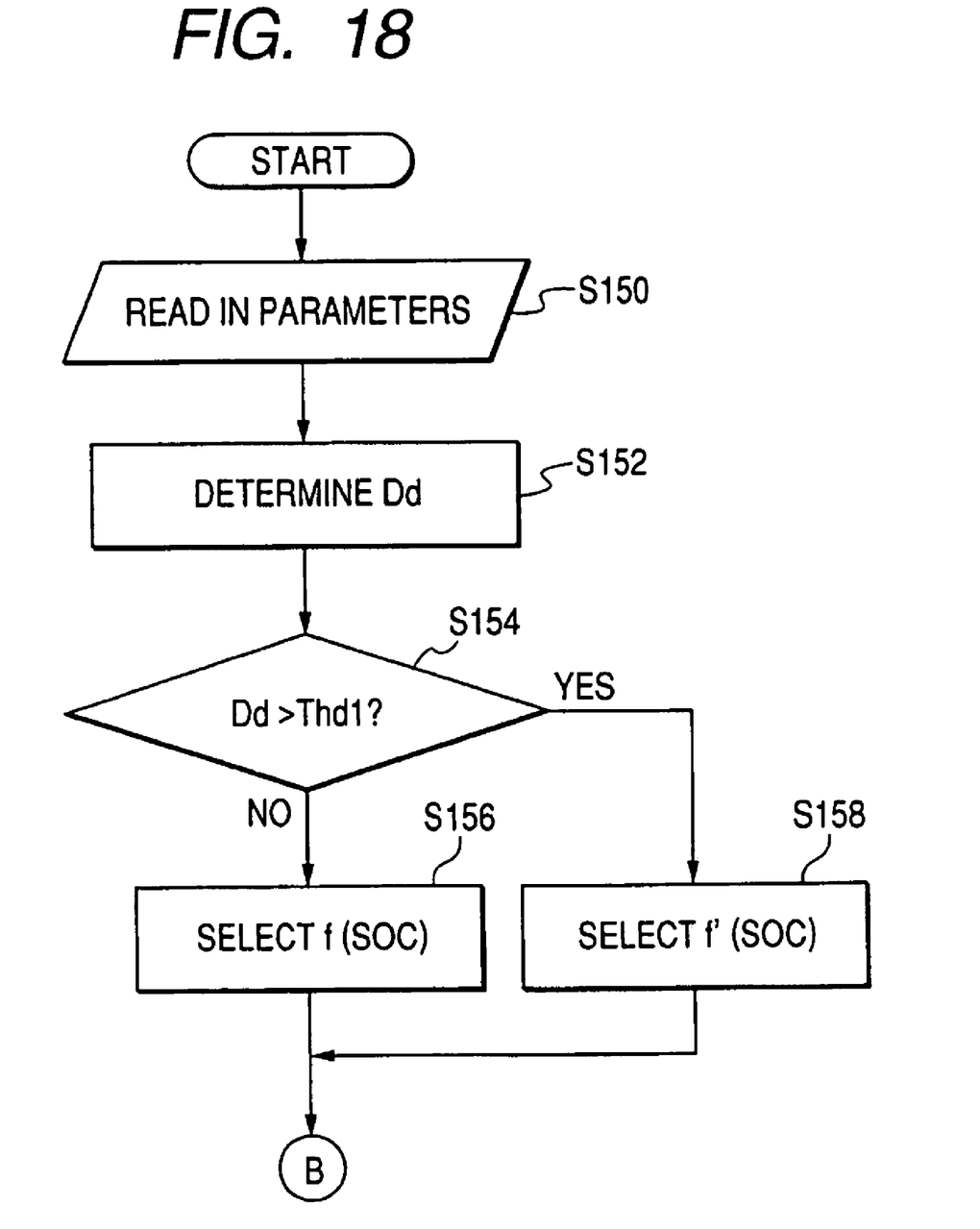
FIGS. 18 and 19 are flow charts together showing a process of the control apparatus for controlling the power generating operation of the alternator according to the third embodiment of the invention.
Figure 19:
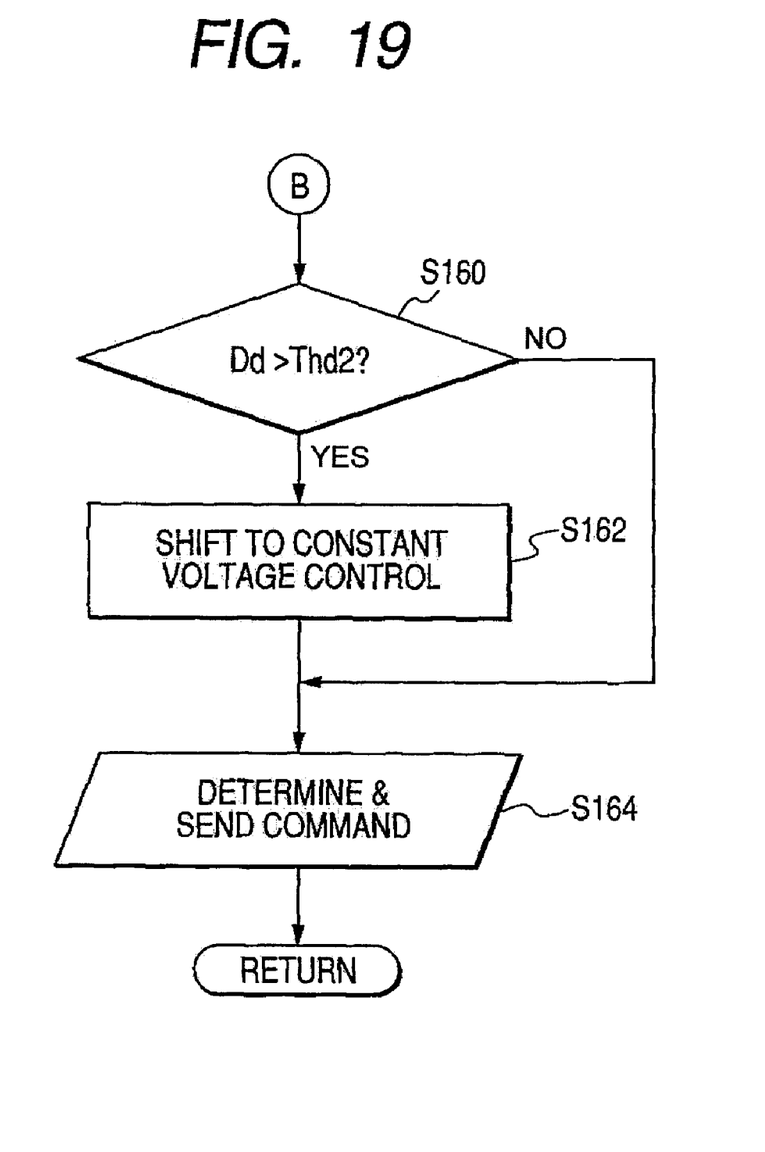

FIGS. 18 and 19 show a process of the control apparatus 4 for controlling the power generating operation of the alternator 1 in consideration of degradation of the battery 2.

First, at the step S150 of FIG. 18, the control apparatus 4 reads in parameters representative of the present condition of the battery 2. Then, at the step S152, the control apparatus 4 determines the degree Dd of degradation of the battery 2 based on the parameters.

In addition, a number of methods have been proposed for determination of degree of battery degradation. In the present embodiment, the degree Dd of degradation of the battery 2 is determined based on the sum of an integration value of the charge current of the battery 2 and an integration value of the discharge current of the battery 2. However, it is also possible to determine the degree Dd based only on either of the integration values.

In the succeeding step S154, the control apparatus 4 determines whether the degree Dd of degradation of the battery 2 exceeds a first threshold Thd1.

If the determination at the step S154 produces a "NO" answer, then the process proceeds to the step S156.

At the step S156, the control apparatus 4 selects the f (SOC) as the threshold function for the control on the power generating operation of the alternator 1. Then, the process goes on to the step S160 of FIG. 19.

Otherwise, if the determination at the step S154 produces a "YES" answer, then the process proceeds to the step S158.

At the step S158, the control apparatus 4 employs the function f' (SOC) as the threshold function for the control on the power generating operation of the alternator 1. Then, the process goes on to the step S160 of FIG. 19.

At the Step 160, the control apparatus 4 determines whether the degree Dd of degradation of the battery 2 exceeds a second threshold Thd2 higher than the first threshold Thd1.

If the determination at the step S160 produces a "YES" answer, then the process proceeds to the step S162.

At the step S162, the control apparatus 4 shifts the present power generation cost control to the constant voltage control. Then, the process goes on to the step S164.

Otherwise, if the determination at the step S160 produces a "NO" answer, then the process directly goes on to the step S164.

At the step S164, the control apparatus 4 determines and sends to the alternator 1 the command for the power generating operation of the alternator 1, so that the alternator 1 can operate in accordance with the command.

With the above process, when there is no degradation of the battery 2, the control apparatus 4 performs the power generation cost control using the threshold function f (SOC) of the first embodiment, thereby minimizing the overall average power generation cost of the alternator 1. Further, when there is a low-degree degradation of the battery 2, the control apparatus 4 performs the power generation cost control using the function f' (SOC) of the present embodiment, thereby decreasing the overall average power generation cost of the alternator 1 while suppressing further degradation of the battery 2. Furthermore, when there is a high-degree degradation of the battery 2, the control apparatus 4 performs the constant voltage control, thereby securing the service life of the battery 2.

While the above particular embodiments of the invention have been shown and described, it will be understood by those who practice the invention and those skilled in the art that various modifications, changes, and improvements may be made to the invention without departing from the spirit of the disclosed concept.

For example, in the previous embodiments, the invention is directed to the control apparatus 4 for controlling the automotive alternator 1 that is driven by the internal combustion engine and configured to charge the automotive battery 2 and feed the electrical load 3 in the electrical system.

However, the invention may be applied to any other control apparatus for controlling an electric generator that is driven by an engine and configured to charge an electric energy storage device and feed an electrical load.

Such modifications, changes, and improvements within the skill of the art are intended to be covered by the appended claims.

What is claimed is:

1. A control apparatus for an electric generator, wherein the electric generator is driven by an engine and configured to charge an electric energy storage device and feed an electrical load, the control apparatus comprising:
- a power generation cost determiner working to determine a power generation cost of the electric generator based on parameters representative of operating condition of the engine and an amount of electric power generated by the electric generator;
- a threshold determiner working to determine a threshold of power generation cost as a function of a State of Charge (SOC) of the electric energy storage device;
- a comparator working to compare the power generation cost of the electric generator with the threshold of power generation cost; and
- a controller working to control the electric generator to generate:
- an increased amount of electric power, if the power generation cost of the electric generator is determined by the comparator as being lower than the threshold, so as to both feed the electrical load and charge the electric energy storage device, and
- a decreased amount of electric power, if the power generation cost of the electric generator is determined by the comparator as being higher than the threshold, so as to allow the electric energy storage device to discharge to feed the electrical load.

2. The control apparatus as set forth in claim 1, wherein the power generation cost of the electric generator is represented by an increase in fuel consumption of the engine for driving the electric generator to generate unit electric power.

3. The control apparatus as set forth in claim 1, further comprising a SOC determiner working to determine the SOC of the electric energy storage device.

4. The control apparatus as set forth in claim 1, wherein the electric energy storage device is charged with an amount of electric power not greater than a maximum allowable charge power of the electric energy storage device.

5. The control apparatus as set forth in claim 1, wherein the electric energy storage device is allowed to discharge an amount of electric power not greater than a maximum allowable discharge power of the electric energy storage device.

6. The control apparatus as set forth in claim 1, wherein the control apparatus controls the electric generator to stop generating electric power if the power generation cost is determined by the comparator as being higher than the threshold.

7. The control apparatus as set forth in claim 1, further comprising a memory storing therein the function which represents a relationship between the SOC of the electric energy storage device and the threshold of power generation cost.

8. The control apparatus as set forth in claim 7, wherein the function is such that the threshold of power generation cost decreases with increase in the SOC of the electric energy storage device in a range from a predetermined lower limit to a predetermined upper limit.

9. The control apparatus as set forth in claim 8, wherein the function is such that the threshold of power generation cost is higher than any possible power generation cost of the electric generator in a range of the SOC lower than the predetermined lower limit, and is lower than any possible power generation cost of the electric generator in a range of the SOC higher than the predetermined upper limit.

10. The control apparatus as set forth in claim 9, further comprising a function modifier that works to modify the function based on a change in the SOC of the electric energy storage device for a time period of a given length.

11. The control apparatus as set forth in claim 10, wherein the function modifier modifies the function through shifting a curve representing the function on a two-dimensional map whose horizontal and vertical axes respectively represent the SOC of the electric energy storage device and the threshold of power generation cost.

12. The control apparatus as set forth in claim 11, wherein the function modifier shifts the curve in a direction to decrease an overall average power generation cost of the electric generator by an amount which decreases with increase in the SOC of the electric energy storage device.

13. The control apparatus as set forth in claim 12, wherein the function modifier determines the amount of shifting the curve as a function of a maximum value of the SOC for the time period.

14. The control apparatus as set forth in claim 12, wherein the function modifier determines the amount of the shift as a function of a minimum value of the SOC for the time period.

15. The control apparatus as set forth in claim 12, wherein the function modifier determines the amount of the shift as a function of an average variation of the SOC for the time period.

16. The control apparatus as set forth in claim 15, wherein the average variation of the SOC is determined by integrating a difference between the SOC and a reference value for the time period.

17. The control apparatus as set forth in claim 16, wherein the reference value is an average of the predetermined lower and upper limits of the SOC.

18. The control apparatus as set forth in claim 8, wherein the function has a first hysteresis loop in a first range of the SOC including the predetermined lower limit and a second hysteresis loop in a second range of the SOC including the predetermined upper limit.

19. The control apparatus as set forth in claim 8, wherein the function has a hysteresis loop that occupies a whole of the range from the predetermined lower limit to the predetermined upper limit.

20. The control apparatus as set forth in claim 8, wherein the function is a linear function.

21. The control apparatus as set forth in claim 8, wherein the function is a quadratic function.

22. The control apparatus as set forth in claim 8, wherein the function is a cubic function.

23. The control apparatus as set forth in claim 8, wherein the function is a sigmoid function.

24. The control apparatus as set forth in claim 1, further comprising a function modifier that works to determine a degree of degradation of the electric energy storage device and modify, based on the determined degree of degradation, the function so as to suppress degradation of the electric energy storage device.

25. The control apparatus as set forth in claim 24, wherein the comparator further compares the degree of degradation of the electric energy storage device with a predetermined threshold, and wherein when the degree of degradation exceeds the predetermined threshold, the controller controls the electric generator to regulate a terminal voltage of the electric energy storage device to a reference voltage.

26. The control apparatus as set forth in claim 1, wherein the electric generator is an automotive alternator and the electric energy storage device is an automotive battery.

27. The control apparatus as set forth in claim 1, wherein the parameters representative of operating condition of the engine include a rotational speed of the engine and an output torque of the engine.

* * * * *